United States Patent
Riggins et al.

(10) Patent No.: US 9,990,519 B2
(45) Date of Patent: Jun. 5, 2018

(54) RFID READER-BASED APPARATUS AND METHOD

(71) Applicant: Wal-Mart Stores, Inc., Bentonville, AR (US)

(72) Inventors: Andrew P. Riggins, Fayetteville, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days. days.

(21) Appl. No.: 15/434,666

(22) Filed: Feb. 16, 2017

(65) Prior Publication Data

US 2017/0243037 A1    Aug. 24, 2017

Related U.S. Application Data

(60) Provisional application No. 62/297,760, filed on Feb. 19, 2016.

(51) Int. Cl.
*H04Q 5/22*    (2006.01)
*G06K 7/10*    (2006.01)
*G06Q 30/00*    (2012.01)

(52) U.S. Cl.
CPC .......... *G06K 7/10386* (2013.01); *G06Q 30/00* (2013.01)

(58) Field of Classification Search
CPC .................................................. G06K 7/10386
See application file for complete search history.

(56) References Cited

U.S. PATENT DOCUMENTS 5,493,107 A    2/1996  Gupta
6,429,776 B1 *  8/2002  Alicot ...................... G06K 1/18
                                                235/462.01

(Continued)

FOREIGN PATENT DOCUMENTS

CN    1628335    6/2005
WO    2003046686    6/2003

OTHER PUBLICATIONS

"Benefits of Implementing RFID in Supply Chain Management;" RFID Arena; http://rfidarena.com/2013/11/14/benefits-of-implementing-rfid-in-supply-chain-management.aspx; Nov. 14, 2013; pp. 1-14.

(Continued)

*Primary Examiner* — Erin M File
(74) *Attorney, Agent, or Firm* — Fitch, Even, Tabin & Flannery LLP

(57) ABSTRACT

A control circuit receives location information from a handheld RFID-tag reader that pertains to a scan of a location marker that correlates to a particular modular within a retail shopping facility. The control circuit also receives from that reader RFID-tag information gleaned from read RFID tags that are proximal to that location marker. The control circuit uses the location information to select specification information for a particular modular of interest and also compares the RFID-tag information with specification information for modulars other than the particular modular of interest to thereby remove some of the RFID-tag information and thereby provide filtered RFID-tag information. The control circuit then compares that filtered RFID-tag information with the specification information for the particular modular of interest to assess modular compliance.

18 Claims, 2 Drawing Sheets

(56) References Cited

U.S. PATENT DOCUMENTS

| | | | |
|---|---|---|---|
| 6,837,427 B2 | 1/2005 | Overhultz | |
| 6,951,305 B2 | 10/2005 | Overhultz | |
| 7,021,535 B2 | 4/2006 | Overhultz | |
| 7,118,036 B1 | 10/2006 | Couch | |
| 7,493,336 B2 | 2/2009 | Noonan | |
| 7,639,138 B2* | 12/2009 | Chang | G01S 3/046 |
| | | | 340/13.31 |
| 8,002,181 B2 | 8/2011 | Ulrich | |
| 8,258,956 B1* | 9/2012 | Kuzma | G06Q 10/087 |
| | | | 235/375 |
| 2003/0174099 A1* | 9/2003 | Bauer | G06K 7/0008 |
| | | | 343/893 |
| 2004/0181467 A1* | 9/2004 | Raiyani | G06Q 10/087 |
| | | | 705/28 |
| 2005/0174236 A1 | 8/2005 | Brookner | |
| 2009/0101712 A1 | 4/2009 | Ulrich | |
| 2010/0148965 A1* | 6/2010 | Alexis | G06K 19/0707 |
| | | | 340/572.1 |
| 2011/0288938 A1* | 11/2011 | Cook | G06Q 30/0251 |
| | | | 705/14.66 |
| 2012/0013440 A1 | 1/2012 | VonBose | |
| 2013/0154809 A1* | 6/2013 | Subramanian | G01S 13/878 |
| | | | 340/10.42 |
| 2013/0173435 A1* | 7/2013 | Cozad, Jr. | G06Q 10/087 |
| | | | 705/28 |
| 2014/0327524 A1 | 11/2014 | Jones | |

OTHER PUBLICATIONS

"OAT Merchandise Visibility—User Guide;" OAT Foundation Suite & OATxpress; Aug. 2009; pp. 1-53.
PCT; App. No. PCT/US2008/074259; International Search Report and Written Opinion dated Jun. 3, 2009.
PCT; App. No. PCT/US2017/018089; International Search Report and Written Opinion dated May 11, 2017.

* cited by examiner

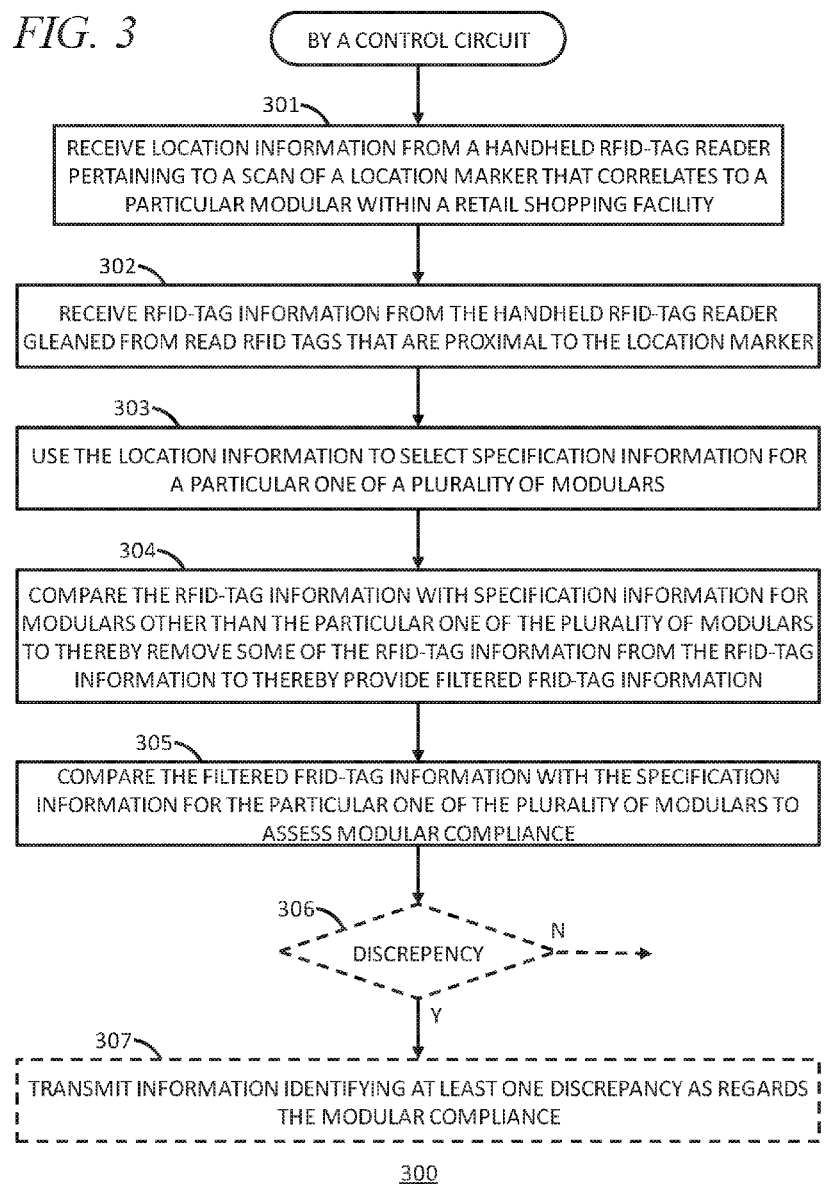

RFID READER-BASED APPARATUS AND METHOD

CROSS-REFERENCE TO RELATED APPLICATION

This application claims the benefit of U.S. Provisional Application No. 62/297,760, filed Feb. 19, 2016, which is incorporated herein by reference in its entirety.

TECHNICAL FIELD

These teachings relate generally to radio-frequency identification (RFID)-tag readers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

Many prior art methodologies provide for installing RFID tag readers (and in particular the antennas for such readers) at certain chokepoints through which most or all tagged items at a given facility might be expected to pass. Other approaches are more aggressive and provide for effectively saturating (or at least attempting to saturate) a given facility with radio frequency energy in an effort to be able to read any RFID tag, any time, at any location within that facility. While effective to some degree, both such approaches are not wholly suitable to meet all needs of all potential users of such systems.

Building a system that attempts to illuminate every location within a given facility, for example, presents a very difficult challenge (in no small part due to maximum power limitations imposed on RFID tag readers by regulation and/or law and further by the fact that the operating environment will often tend to be highly dynamic with various bodies and surfaces moving from one location to another with corresponding effects upon the radio frequency environment from one spot to another). Accordingly, such an approach can represent both a considerable cost and also one that is subject to numerous frailties of the moment engendered by the dynamics of the application setting.

Being able to read and then uniquely identify each item within a retail shopping facility area offers any number of useful opportunities. Unfortunately, the very nature of RFID-based technology, coupled with a correspondingly potentially enormous number of individually-tagged items, also gives rise to a number of challenges as well. As one simple example in these regards, retailers often present their items as modularized offerings (using a support platform of choice, such as a shelf or set of shelves, a tabletop, a display rack, and so forth). In many application settings these modulars are physically discrete displays of items that are offered for retail sale.

In such a case, it can be helpful to inventory such items on a modular-by-modular basis. Unfortunately, present RFID tag methodologies and approaches offer little to specifically support such an approach. Even using a handheld RFID-tag reader to read the tags of contents of a given modular, for example, can lead to ambiguous and/or confusing results because the reader is also likely in many application settings to read nearby tags for items that are not part of the modular of interest.

BRIEF DESCRIPTION OF THE DRAWINGS

The above needs are at least partially met through provision of the RFID reader-based apparatus and method described in the following detailed description, particularly when studied in conjunction with the drawings, wherein:

FIG. 3 comprises a flow diagram as configured in accordance with various embodiments of these teachings.

Figure 1:
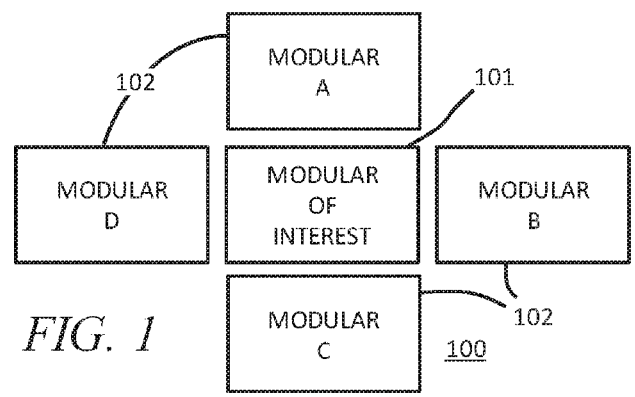
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, various embodiments presume the availability and use of a handheld RFID-tag reader. A control circuit receives location information from the handheld RFID-tag reader that pertains to a scan of a location marker that correlates to a particular modular within a retail shopping facility. The control circuit also receives from that handheld RFID-tag reader RFID-tag information gleaned from read RFID tags that are also sufficiently proximal to the location marker. The control circuit uses the location information to select specification information for a particular modular of interest and also compares the RFID-tag information with specification information for modulars other than the particular modular of interest to thereby remove some of the RFID-tag information and thereby provide filtered RFID-tag information. The control circuit then compares that filtered RFID-tag information with the specification information for the particular modular of interest to assess modular compliance.

By one approach the aforementioned location marker includes optically-coded information. In such a case the handheld RFID-tag reader can comprise an optical-code scanner as well. By another approach the aforementioned location marker includes RFID-encoded information. In such a case the handheld RFID-tag reader can make use of its already-available RFID-tag reader capabilities to scan the location marker.

These teachings anticipate that the handheld RFID-tag reader will read tags that correspond to the modular of interest while also simultaneously reading tags that correspond to nearby modulars that are not of interest. By identifying those modulars that are near the modular of interest, and subtracting the RFID-tag information that corresponds to those modulars, a considerable amount of RFID-tag information can be removed from the read results without likely distorting the validity of the read results in most settings.

These and other benefits may become clearer upon making a thorough review and study of the following detailed description. Referring now to the drawings, and in particular to FIG. 1, it may be helpful to first briefly describe and characterize an application setting 100 that is relevant to these teachings.

In this illustrative application setting 100 presents a modular of interest 101 that is surrounded by other modulars 102. As used herein, the expression "modular" will be understood to refer to a planned and specified retail product display. The products displayed in a modular may all be identical or may differ from one another. A modular may comprise products displayed using, for example, a single shelf or a plurality of shelves, a rack, a bin or other container that may or may not include a door, a counter or table top, a display case, an endcap display, and so forth. Accordingly, a modular may comprise an enclosed display or an open display as desired.

Viewing this application setting 100 as a top plan view, the modular of interest 101 has other adjacent modulars 102 closely located on its sides. Viewing this application setting 100 as a front elevational view, the modular of interest 101 has other adjacent modulars 102 located on two of its sides and also above and below itself. In all of these cases it can be seen and understood that reading RFID tags contained within the modular of interest 101 will also likely read RFID tags that are contained within the adjacent modulars 102 that are not of interest. RFID-tag information obtained from adjacent modular 102, in turn, will present a distorted picture of the contents of the modular of interest 101 by including products that should not be present in the modular of interest 101 and which in fact are not present in the modular of interest 101.

Figure 2:
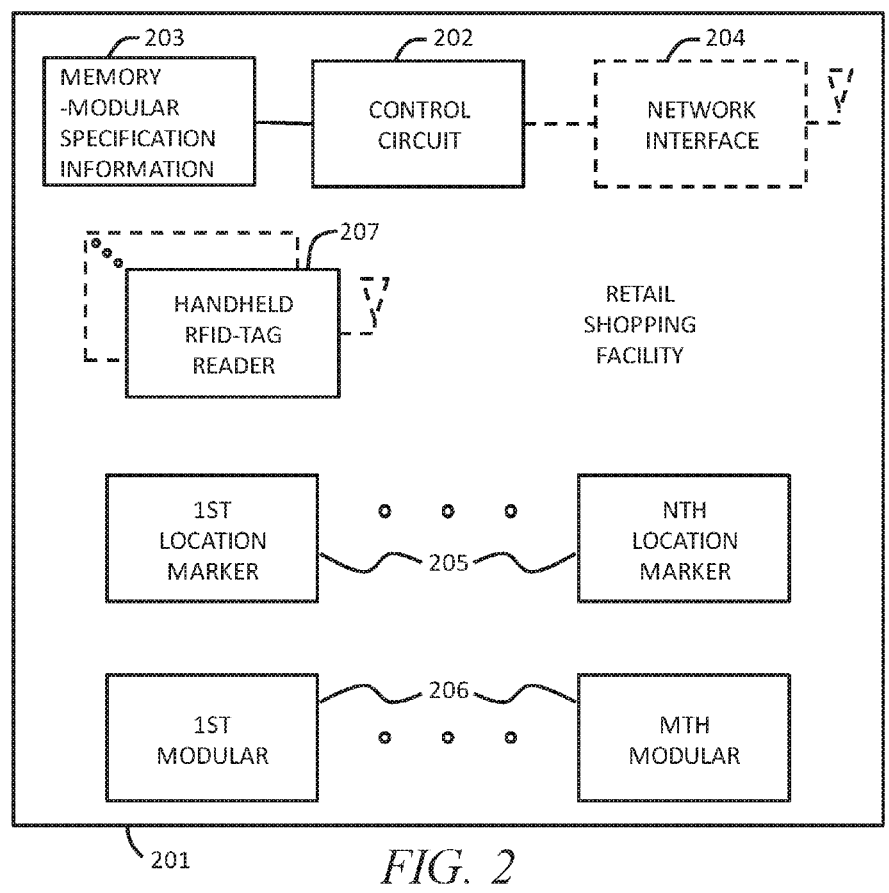
FIG. 2 comprises a block diagram as configured in accordance with various embodiments of these teachings.

Such an application setting 100 can be found, for example, in a retail shopping facility such as the retail shopping facility 201 presented in FIG. 2. This retail shopping facility 201 comprises a retail sales facility or any other type of bricks-and-mortar (i.e., physical) facility in which products are physically displayed and offered for sale to customers who physically visit the facility. The shopping facility may include one or more of sales floor areas, checkout locations (i.e., point of sale (POS) locations), customer service areas other than checkout locations (such as service areas to handle returns), parking locations, entrance and exit areas, stock room areas, stock receiving areas, hallway areas, common areas shared by merchants, and so on. The facility may be any size of format facility, and may include products from one or more merchants. For example, a facility may be a single store operated by one merchant or may be a collection of stores covering multiple merchants such as a mall.

In this particular example, the retail shopping facility 201 includes a control circuit 202. Being a "circuit," the control circuit 202 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 202 is configured (for example, by using corresponding programming as will be well understood by those skilled in the art) to carry out one or more of the steps, actions, and/or functions described herein.

By one optional approach the control circuit 202 operably couples to a memory 203. This memory 203 may be integral to the control circuit 202 or can be physically discrete (in whole or in part) from the control circuit 202 as desired. This memory 203 can also be local with respect to the control circuit 202 (where, for example, both share a common circuit board, chassis, power supply, and/or housing) or can be partially or wholly remote with respect to the control circuit 202 (where, for example, the memory 203 is physically located in another facility, metropolitan area, or even country as compared to the control circuit 202).

In addition to storing specification information for one or more modulars (i.e., information that specifies the actual and/or intended product contents of specific given modulars), this memory 203 can serve, for example, to non-transitorily store the computer instructions that, when executed by the control circuit 202, cause the control circuit 202 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 202 can also optionally operably couple to a network interface 204. So configured the control circuit 202 can communicate with other elements (both within the retail shopping facility 201 and external thereto) via the network interface 204. Network interfaces, including both wireless and non-wireless platforms, are well understood in the art and require no particular elaboration here.

This retail shopping facility 201 also includes a plurality of location markers 205. These location markers 205 are, for example, labels, plaques, or signs or the like that are affixed or otherwise attached in place at various locations throughout the retail shopping facility 201. These location markers 205 may be fixed, for example, on the floor of the retail shopping facility 201, on columns or other components of the building that comprises the retail shopping facility 201, on the display infrastructure such as shelving and/or display cases, and so forth as desired.

By one approach these location markers 205 provide direct defining information regarding their respective location. For example, the location information may comprise latitude and longitude information. By another approach, these location markers 205 provide information that uniquely identifies each location marker ("unique" at least within the context of the retail shopping facility 201 itself) and which identifying information is correlated with location information (for example, within the aforementioned memory 203). In that case, the identifier as provided by a given location marker 205 can be used to access a previously-correlated location of that location marker 205.

By one approach the location marker 205 comprises an optical location marker in that the location marker 205 conveys the aforementioned information visually. By one simple approach the visually-conveyed information is alphanumeric content such as a code of choice (for example, "A-267"). In lieu of the foregoing or in combination therewith, the visual information may comprise, for example, a one or two-dimensional optical code such as a barcode. By another approach, in lieu of the foregoing or in combination therewith, the location marker 205 may comprise an RFID-tag location marker. In this case, the RFID tag that comprises a part of the location marker 205 can convey the aforementioned location information when interrogated by a compatible RFID-tag reader.

With continued reference to FIG. 2, and as described above, this retail shopping facility 201 also includes a plurality of modulars 206 (represented here as a $1^{st}$ modular through an Nth modular, where "N" is an integer greater than 1). As already explained above, each of these modulars 206 includes one or more products that are offered for sale at the retail shopping facility 201. The items in a particular modular 206 may be very homogenous or very heterogeneous as befits the particular needs of the enterprise that operates the retail shopping facility 201.

In this example at least some of these modulars 206 are co-located with at least one of the aforementioned location markers 205. By one approach the location marker 205 may be physically attached to the display infrastructure of the modular 206 itself. By another approach the location marker 205 is attached to some other part of the retail shopping facility 201 in an area that is close to the modular 206 (for example, within some predetermined distance such as one foot, three feet, ten feet, or some other distance of choice).

In this illustrative example the retail shopping facility 201 also includes at least one handheld RFID-tag reader 207. RFID-tag readers, including handheld devices, are well known in the art. So long as the RFID-tag reader 207 is compatible with the RFID tags being used at the retail shopping facility 201 to tag products (and possibly with the location markers 205 when the latter employ RFID tags to convey their location/identification information), the present teachings are not especially sensitive to any particular choices in these regards. Accordingly, further elaboration is not presented here regarding RFID-tag readers for the sake of brevity.

It will be noted, however, that the aforementioned control circuit 202 may be located at (i.e., contained within) the handheld RFID-tag reader 207 or may, as suggested by FIG. 2, be located at a location that is remote from the handheld RFID-tag reader 207 as desired. It will further be noted that the handheld RFID-tag reader 207 may include a wireless communications capability (such as a Wi-Fi transceiver as is known in the art) by which the handheld RFID-tag reader 207 can wirelessly communicate with other elements including, for example, the control circuit 202 when the latter is remotely located with respect to the handheld RFID-tag reader 207.

FIG. 3 presents a process 300 that can be carried out in conjunction with the above-described apparatus and in particular by the aforementioned control circuit 202.

At block 301 the control circuit 202 receives location information from the handheld RFID-tag reader 207 pertaining to a scan of a location marker 205 that correlates to a particular modular 206 of interest within the retail shopping facility 201. For example, a location marker 205 maybe attached to a shelf that comprises a part of the modular display and the handheld RFID-tag reader 207 compatibly scans that location marker 205 to obtain that location information.

At block 302 the control circuit 202 receives RFID-tag information as gleaned by the handheld RFID-tag reader 207 from read RFID tags that are proximal to the location marker 205. With momentary reference to FIG. 1, the RFID tags that are read by the handheld RFID-tag reader 207 likely include RFID tags that correspond to products in the modular of interest 101 but also include RFID tags that correspond to products in one or more of the nearby modulars 102 that are not of immediate interest.

This RFID-tag information can comprise, for example, a unique identification number for each tag. The Electronic Product Code (EPC) as managed by EPCGlobal, Inc., for example, represents one such effort in these regards. EPC-based RFID tags each have an utterly unique serial number (within the EPC system) to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.)

It should be noted that these two activities (i.e., receiving location information and receiving RFID-tag information) can be undertaken in the order shown in FIG. 3 or may be undertaken in a reverse order. Accordingly, these teachings will accommodate receiving the location information prior to receiving the RFID-tag information or subsequent to receiving the RFID-tag information as desired. It would also be possible, if desired, to receive the location information while also receiving the RFID-tag information (i.e., while reading the RFID tags).

At block 303 the control circuit 202 uses the aforementioned location information to select specification information (for example, as retrieved from the aforementioned memory 203) for a particular one of the plurality of modulars 206 (i.e., the modular of interest 101). In particular, the control circuit 202 selects specification information for the modular 206 that is associated with that particular location information. (These teachings will readily accommodate supplementing or substituting this approach with any other suitable way of identifying the appropriate modular 206 and retrieving the specification information for that particular modular 206.) At the same time, the control circuit 202 can use that location information (and/or other information as available) to also select specification information for other modulars (i.e., modulars 102 that are sufficiently adjacent the modular of interest 101) if desired.

At block 304 the control circuit 202 then compares the RFID-tag information gleaned from reading the RFID tags at the indicated location with the specification information for modulars 102 other than the modular of interest 101 and, in particular, removes some of the RFID-tag information from the RFID-tag information to thereby provide filtered RFID-tag information.

As one simple example in these regards to illustrate this activity, when the specifications for the modular of interest 101 specify a variety of differently-sized jeans of a particular brand, and when the specifications for two adjacent modulars that are not of interest 102 specify various shirts and sweaters, the foregoing activity can comprise removing the RFID-tag information for tagged shirts and sweaters from the RFID-tag information such that the resultant filtered RFID-tag information excludes the products that are specified for those adjacent modulars that are not of interest 102.

At block 305 the control circuit 202 then compares the filtered RFID-tag information with the specification information for the particular one of the plurality of modulars 206 (i.e., the modular of interest 101) to assess modular compliance. By one approach this comprises determining whether the modular of interest 101 contains all of the items (both in terms of type of product as well as the correct number of each type of product) and also whether the modular of interest 101 does not contain other items that are not specified to be presented in the modular of interest 101.

By filtering out items specified for nearby modulars 102, the teachings can greatly improve the accuracy and value of the information gleaned when reading the RFID tags for products that are presented in a modular of interest 101. In particular, these teachings can help to reduce false negatives (i.e., incorrect conclusions that the modular of interest 101 contains items that should not be there).

At optional block 306, upon identifying at least one discrepancy as regards the modular compliance the control circuit 202 can cause (at block 307) information to be transmitted that identifies the at least one discrepancy. When the control circuit 202 is located remotely from the handheld RFID-tag reader 207, this transmission can comprise a transmission to the handheld RFID-tag reader 207. That transmission can then be appropriate displayed to inform the associate using the handheld RFID-tag reader 207 about the discrepancy. So informed, the associate can then take immediate steps, if appropriate, to remedy or otherwise correct the discrepancy (for example, by removing an unspecified item from the modular or by placing a particular specified item within the modular).

So configured, even a relatively untrained associate can conduct reliable RFID tag-based inventory and compliance studies on a modular-by-modular basis. Such studies can supplement an existing storewide RFID-based reading system or can serve as a standalone platform as appropriate to the application setting.

Those skilled in the art will recognize that a wide variety of modifications, alterations, and combinations can be made with respect to the above described embodiments without departing from the scope of the invention. As but one example in these regards, to supplement use of location information (or even as a substitute for location information), these teachings will accommodate analyzing the read tags to help identify one or more modulars of interest. As a simple corresponding illustration, when the tags being read in a particular area include a relevant number of tags for chocolate bars, graham crackers, and marshmallows, it may be appropriate to reasonably conclude that the handheld reader is in an area that includes a known modular for S'mores. Such modifications, alterations, and combinations are to be viewed as being within the ambit of the inventive concept.

What is claimed is:

1. An apparatus comprising:
a handheld radio-frequency identification (RFID)-tag reader;
a memory having specification information for a plurality of modulars that correspond to a retail shopping facility;
a control circuit configured to:
receive from the handheld RFID-tag reader location information pertaining to a scan of a location marker that correlates to a particular one of the plurality of modulars within the retail shopping facility;
receive from the handheld RFID-tag reader RFID-tag information gleaned from read RFID tags proximal the location marker;
use the location information to select the specification information for the particular one of the plurality of modulars;
compare the RFID-tag information with specification information for modulars other than the particular one of the plurality of modulars by identifying RFID-tag information that corresponds to modulars other than the particular one of the modulars and then removing the RFID-tag information that corresponds to modulars other than the particular one of the modulars from the RFID-tag information to thereby provide filtered RFID-tag information;
compare the filtered RFID-tag information with the specification information for the particular one of the plurality of modulars to assess modular compliance.

2. The apparatus of claim 1 wherein the location information pertains to an optical scan of an optical location marker.

3. The apparatus of claim 1 wherein the location information pertains to an RFID scan of an RFID-tag location marker.

4. The apparatus of claim 1 wherein the control circuit is configured to receive the location information prior to receiving the RFID-tag information.

5. The apparatus of claim 1 wherein the control circuit is configured to receive the location information subsequent to receiving the RFID-tag information.

6. The apparatus of claim 1 wherein the control circuit is further configured to:
transmit information identifying at least one discrepancy as regards the modular compliance.

7. The apparatus of claim 6 wherein the control circuit is configured to transmit the information identifying the at least one discrepancy as regards the modular compliance to the handheld RFID-tag reader.

8. The apparatus of claim 6 wherein the control circuit is configured to transmit the information identifying the at least one discrepancy as regards the modular compliance to other than the handheld RFID-tag reader.

9. The apparatus of claim 1 wherein the control circuit is located at at least one of:
the handheld RFID-tag reader; and
a location remote from the handheld RFID-tag reader.

10. A method comprising:
by a control circuit:
receiving from a handheld RFID-tag reader location information pertaining to a scan of a location marker that correlates to a particular one of a plurality of modulars within a retail shopping facility;
receiving from the handheld RFID-tag reader RFID-tag information gleaned from read RFID tags that are proximal the location marker;
using the location information to select specification information for the particular one of a plurality of modulars;
comparing the RFID-tag information with specification information for modulars other than the particular one of the plurality of modulars by identifying RFID-tag information that corresponds to modulars other than the particular one of the modulars and then removing the RFID-tag information that corresponds to modulars other than the particular one of the modulars from the RFID-tag information to thereby provide filtered RFID-tag information;

comparing the filtered RFID-tag information with the specification information for the particular one of the plurality of modulars to assess modular compliance.

11. The method of claim 10 wherein the location information pertains to an optical scan of an optical location marker.

12. The method of claim 10 wherein the location information pertains to an RFID scan of an RFID-tag location marker.

13. The method of claim 10 wherein receiving the location information comprises receiving the location information prior to receiving the RFID-tag information.

14. The method of claim 10 wherein receiving the location information comprises receiving the location information subsequent to receiving the RFID-tag information.

15. The method of claim 10 further comprising:
transmitting information identifying at least one discrepancy as regards the modular compliance.

16. The method of claim 15 wherein transmitting the information identifying the at least one discrepancy as regards the modular compliance comprises transmitting the information identifying the at least one discrepancy to the handheld RFID-tag reader.

17. The method of claim 15 wherein transmitting the information identifying the at least one discrepancy as regards the modular compliance comprises transmitting the information identifying the at least one discrepancy to other than the handheld RFID-tag reader.

18. The method of claim 10 wherein the control circuit is located at at least one of:
the handheld RFID-tag reader; and
a location remote from the handheld RFID-tag reader.

* * * * *